(No Model.)  3 Sheets—Sheet 2.
G. RAGOT & G. SMYERS.
PETROLEUM AND GAS MOTOR.
No. 350,769.  Patented Oct. 12, 1886.
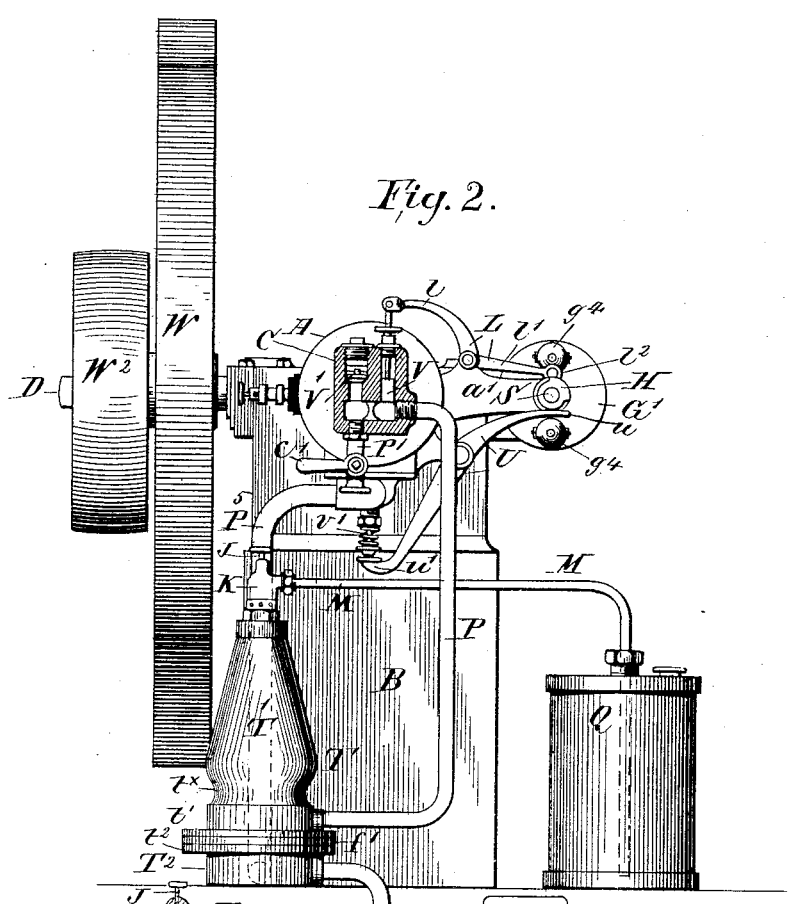
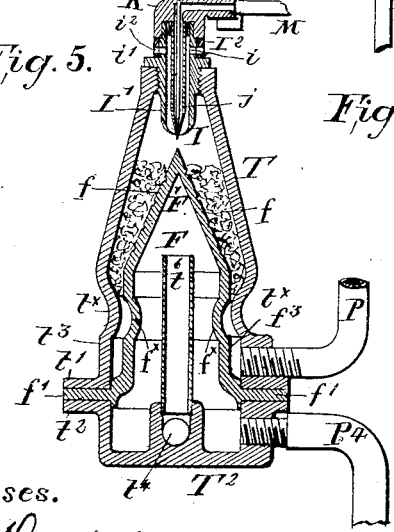
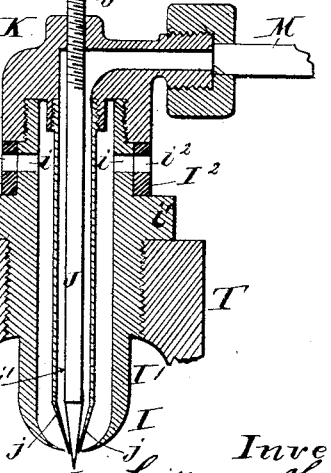
Witnesses.
Wm R Davis
W. E. Boulter
Inventor.
Guillaume Smyers
Gaston Ragot
Henry Ott
Attorney.

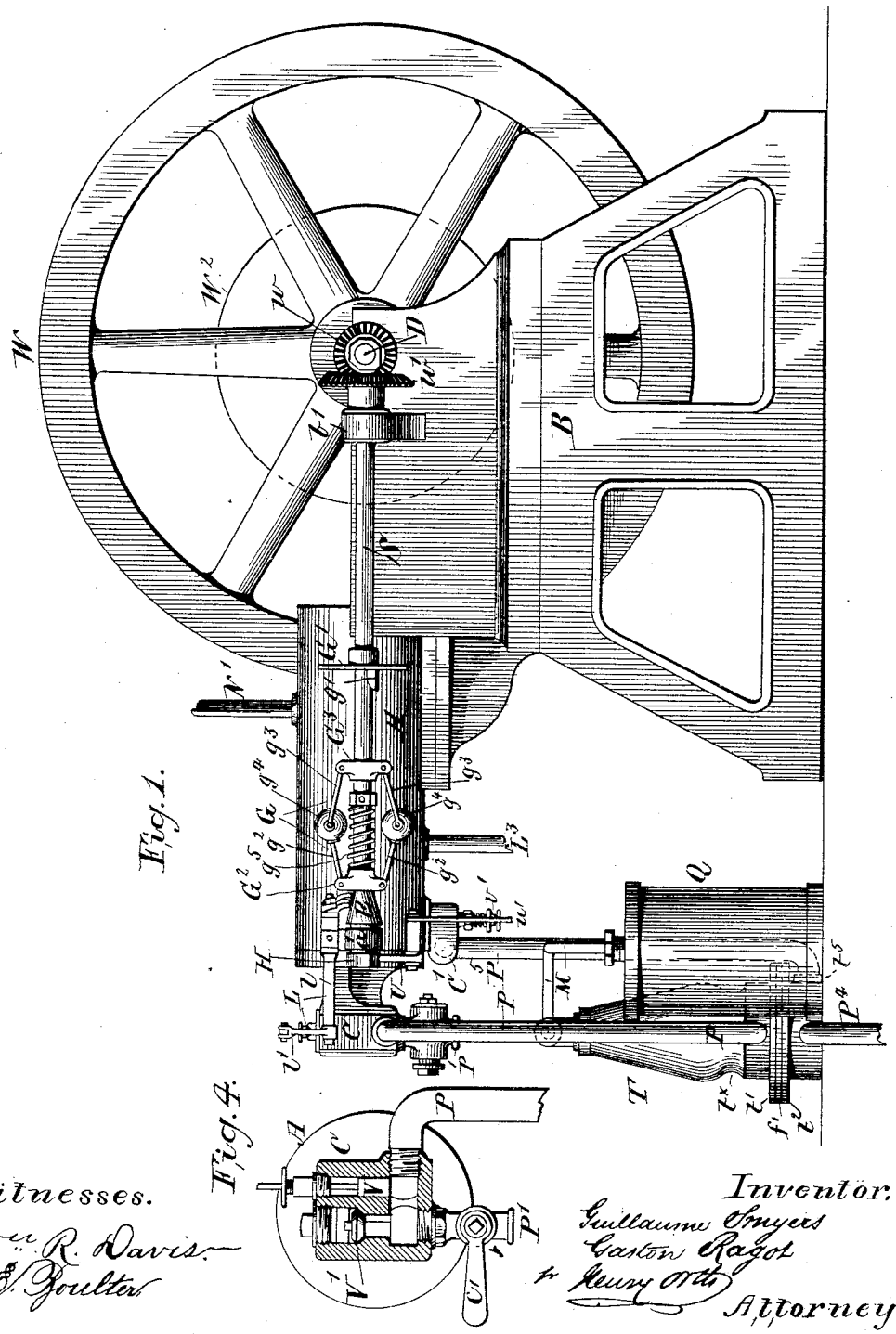

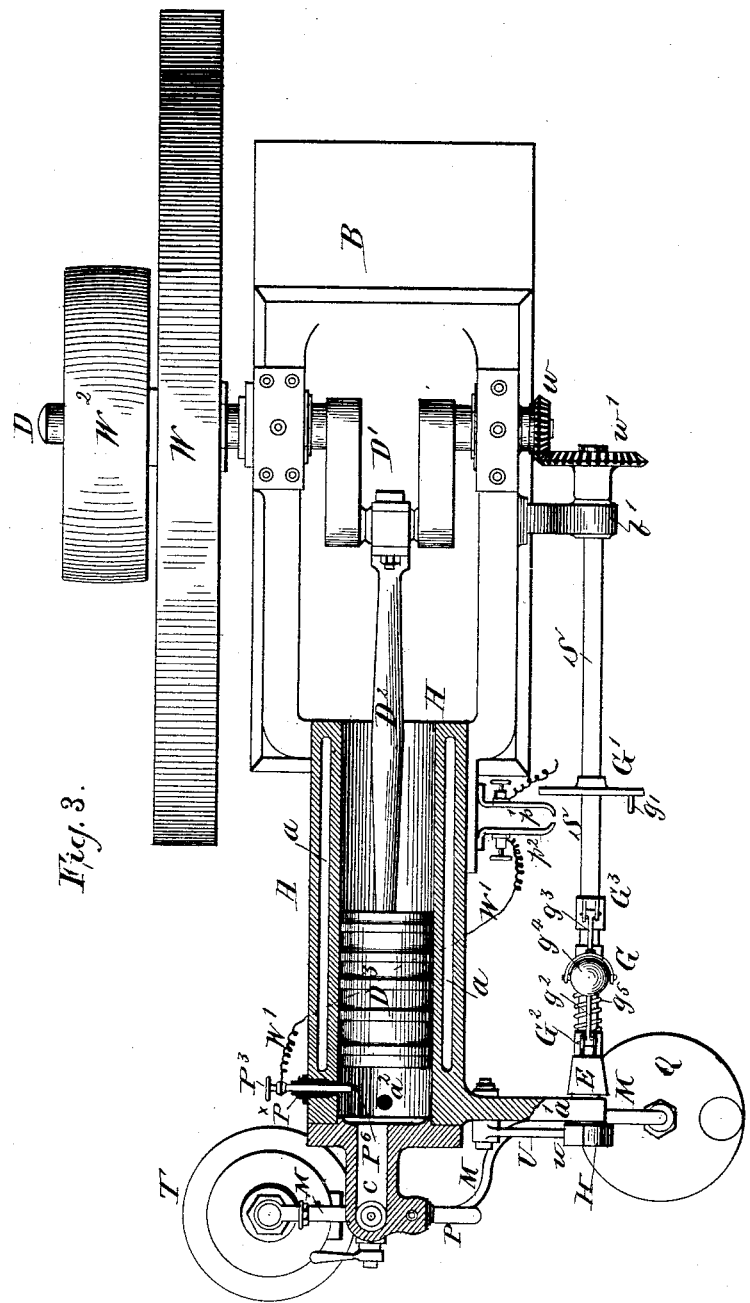

UNITED STATES PATENT OFFICE.

GASTON RAGOT AND GUILLAUME SMYERS, OF BRUSSELS, BELGIUM, ASSIGNORS TO THE SOCIÉTÉ ANONYME DES MOTEURS INEXPLOSIBLES AU PÉTROLE ORDINAIRE ET AU GAZ, OF SAME PLACE.

PETROLEUM AND GAS MOTOR.

SPECIFICATION forming part of Letters Patent No. 350,769, dated October 12, 1886.

Application filed July 2, 1886. Serial No. 206,996. (No model.) Patented in Belgium June 8, 1885, No. 69,187; in France December 10, 1885, No. 172,833; in Norway December 31, 1885; in Austria-Hungary March 4, 1886, No. 36,364 and No. 4,230, and in Germany April 7, 1886, No. 36,054.

*To all whom it may concern:*

Be it known that we, GASTON RAGOT and GUILLAUME SMYERS, citizens of the Kingdom of Belgium, residing at Brussels, have invented certain new and useful Improvements in Petroleum and Gas Motors, (for which we have obtained patents in Belgium by Letters Patent No. 69,187, dated June 8, 1885; in France by Letters Patent No. 172,833, dated December 10, 1885; in Norway by Letters Patent dated December 31, 1885; in Austria-Hungary by Letters Patent dated March 4, 1886, Nos. 36,364 and 4,230; in Germany by Letters Patent dated April 7, 1886, No. 36,054;) and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Referring to the drawings, Figure 1 is a side elevation of our improved gas-engine. Fig. 2 is an end view thereof, the valve-casing containing the admission-valves being shown in section. Fig. 3 is a top plan view of the engine, the working-cylinder and admission-valve casing being shown in section. Fig. 4 is a sectional view of the valve-casing containing the admission-valves for the gases, on an enlarged scale. Fig. 5 is a vertical central section of our improved vaporizer, and Fig. 6 is a like view of the injector in the upper end of the vaporizer drawn to an enlarged scale.

The object of our invention is to provide a vaporizer for gas-engines, whereby the liquid fuel may be vaporized and fed to the engine as required; and the invention consists in the combination, with a gas-engine, of a vaporizer of novel construction, substantially as hereinafter fully described, and as set forth in the claims.

In the drawings, B indicates the main framework from which the operative parts of the engine are supported; D, the main driving or crank shaft that carries at one end a belt-pulley, $W^2$, and the fly or balance wheel, W, and at the other end a bevel-pinion, $w$.

A is the working or power cylinder that is constructed, as usual, with double inclosing-walls to form a cooling-jacket, $a$, Fig. 2, for well-known purposes, the refrigerant being admitted at $X'$ and exhausted at $L^2$, as shown at Fig. 1.

$D^3$ is the piston; $D^2$, the connecting rod connected in any well-known or preferred manner to the crank $D'$ of the crank-shaft D.

On one side of the machine is arranged a counter shaft, S, that has its bearings in arms or brackets $b'$ $a'$, formed on or secured to the main frame B and outer end of the cylinder A, respectively, as shown in Figs. 1, 2, and 3. The counter-shaft S is driven from the crank-shaft D through the bevel-pinion $w$ on said crank-shaft, and a like pinion, $w'$, on shaft S, Figs. 1 and 2, and said shaft carries a disk, $G'$, from which projects a lug or pin, $g'$, Figs. 1 and 2, that acts as a circuit-closer, as hereinafter described. The shaft S also carries a governor, G, that shown being an ordinary ball-governor, one end of the links $g^2$ $g^3$ of which being connected with balls $g^4$ $g^5$ and the other end with the loose sleeve $G^2$ and the fast sleeve $G^3$, respectively, and $g^5$ is the spring that serves to return the loose sleeve $G^2$ into its normal position whenever moved out of it by an increase in the centrifugal action of the governor-balls due to an increase in the velocity of the shaft S.

To the outer end of the loose governor-sleeve $G^2$ is secured, or it may form an integral part thereof with the smaller end facing said cone, sleeve E, that is free to follow the movements of the said sleeve $G^2$ longitudinally of the shaft S, which latter carries at its outer end a cam, H, that serves in connection with the conical sleeve E to operate the exhaust and admission valves, respectively.

At the outer end of the working-cylinder A is a valve-casing, C, in which are arranged two valves, V and V', the former to admit to the cylinder the charge of gas or vapor and the latter the charge of air or a carbureting gas to form the explosive compound.

As more plainly shown in Fig. 4, the gas or vapor is admitted to the valve-casing C by a pipe, P, while the air is admitted thereto by a pipe, P', provided with a stop-cock, $c'$, or a valve whereby the volume of air admitted is regulated. The valves V and V' are both gravity-valves, the former being, however, controlled from the governor through the conical sleeve E by the lever L. This lever is pivoted to the arm $a'$, projecting from the cylinder A, in which arm one end of shaft S has its bearings, as above set forth, the arm $l$ of lever L being pivoted to a regulating stem or rod, $v$, of the valve V, while the arm $l'$, to reduce friction, carries a friction-roller, $l^2$, that rides upon the conical sleeve E of the governor G, as more plainly shown in Fig. 2. If the relative arrangement of the governor, the controlling-stem $v$, and valve V is such that when the governor is in its normal position—that is to say, when the shafts D and S revolve at a normal speed—the said stem $v$ will contact with the upper face of the valve V when the latter has fully uncovered the admission-port $c$ for the vapors, as shown in Fig. 4. In case of an increase in the speed of the shafts, the conical sleeve E will be drawn toward the right, its gradually-increasing diameter causing the arm $l'$ of lever L to rise, and consequently depressing the arm $l$ of said lever and with it the stem $v$, thereby preventing the valve V to fully uncover the port $c$. The area of the port $c$ uncovered by the valve V will therefore depend on the speed of the shafts D S, and thereby control the volume of the charge of explosive gases through the governor G.

Below the cylinder A is a valve-casing, C', in which is arranged an exhaust-valve that opens or closes the exhaust-port $a^2$, Fig. 3, in cylinder A. This valve is controlled by the cam H on shaft S, heretofore referred to, through a lever, U, Fig. 2, the end $u$ of which rides on the cam while the end $u'$ lies in contact with the stem $v'$ of said exhaust-valve. The arrangement of these parts relatively to the movements of the piston is such that after the explosion of the charge the exhaust-valve will open for a moment to exhaust the spent gases from the cylinder A, and will then close and remain closed until the piston again reaches the proper point of its outward stroke. The spent gases may be exhausted into the atmosphere, as is usual. We prefer, however, to utilize them for heating purposes, as hereinafter described.

The electrical igniting devices, whereby the spark that ignites the charge in the cylinder is produced, are constructed and operated as follows, referring to Fig. 3. Upon the base-plate of the main frame B, or any other suitable point, is located an electric battery or other suitable source of electricity, which we have deemed unnecessary to show. $p'\ p^2$ are two contact-springs secured to and isolated from the cylinder and from each other, and they are normally out of contact, and W' is one of the battery-wires that connects the springs with one pole of the battery and with a strip of platinum, $P^3$, that passes through and projects from the under side of a porcelain plug, $P^x$, secured in an opening in the working-cylinder A, from which the plug is isolated, the other pole of the battery being connected by a wire (not shown) with the cylinder. The projecting end of the platinum strip $P^3$ may be so arranged as to lie in close proximity to the inner periphery of the cylinder A to produce the spark, or a desired strip of platinum, $P^4$, in electrical connection with the cylinder but isolated from the strip $P^6$, may be employed, as shown. It will be seen that as the lug or pin $g'$ on disk G', during the rotation of the shaft S, reaches the spring $p'$, it will move it in contact with spring $p^2$ to complete the circuit, and this occurs at the proper time—namely, when the piston has reached the limit of its inward movement, at which time the charge has been admitted and compressed. It is obvious that the pipe P may be connected with any suitable source of gas or vapor supply. When, however, the engine is working with liquid fuel, it is necessary to vaporize the same prior to its admission to the combustion-chamber of the cylinder.

One of the objects of our invention is to provide a simple apparatus for vaporizing hydrocarbons or other volatile liquids for use as an explosive agent in gas-engines, and this apparatus we will now describe, referring more particularly to Figs. 5 and 6. T is a conical casing, formed of two parts—namely, of the cone proper, T', terminating in a cylindrical portion or throat that is preferably contracted, as shown at $t^x$, and that is provided with a flange, $t'$, and of a cylindrical base, $T^2$, that has an annular flange, $t^2$. Within this casing T is seated a smaller hollow cone, F, that terminates in an annular base-flange, $f'$, secured between the flanges $t'\ t^2$ of the cone-sections T' $T^2$. The inner hollow cone, F, has substantially the same form as the outer inclosing-cone, T, except that the cone proper, F', is formed on greater angles, so as to form a chamber of considerable area between the cones T' F', while the diameter of the cylindrical portion or throat of the inner cone, which is also preferably contracted, as shown at $f^x$, is but little less than that of the outer cone, thus leaving between the throats $t^3\ f^3$ of the cones a very narrow annular passage that is made undulating vertically by the contracted parts $t^x\ f^x$ of the cones, for a purpose presently explained. To this narrow passage is connected the vapor-supply pipe P that conducts the vapors to the valve-casing C, the connection being effected below the contracted portion of the cones, as shown. In the base $T^2$ is formed a tubular passage, $t^4$, that communicates with a port, $t^5$, to which the exhaust-pipe $P^5$ of the engine is connected, so that the hot exhaust-gases will pass from the valve-casing C' through pipe $P^5$ and port $t^5$, and thence through a tube, $t^6$, into the upper portion of the inner hollow cone, F. The hot exhaust or spent gases, after giving up the greater portion of their heat to the cone, escape into the atmosphere by pipe $P^4$. The inner cone, F, should be constructed of a material that is a good conductor of heat, and we preferably construct the same of copper, and with a view to produce a more rapid and perfect radiation of the heat we form on the outer periphery of the said cone F radiating ribs $f$.

It is obvious that if a volatile liquid is fed axially to the casing T in a sufficiently attenuated stream, it will fall upon the heated surfaces of the cone F and become at once volatilized, the cone filling with the vapors, which pass into pipe P to valve-casing C to be admitted into the working-cylinder at proper times.

In order to insure the rapid volatilization of the hydrocarbons, it is desirable to feed the same in a very attenuated and subdivided condition to the vaporizer and to maintain them in that condition within the apparatus. This we attain by means of an injector, I, that is constructed as follows: I' is the inclosing-casing, the end of which is conical or tapering. Said casing is screw-threaded for a portion of its length and has a collar or flange, $i'$, above said screw-threaded portion, that seats upon the upper end of the cone T' of casing T when screwed into said end. Above the seat-flange the diameter of the casing is reduced, and the outer end thereof is screw-threaded to receive a coupling or cap, K. On the casing I', between the flange $i'$ and the cap K, is mounted a ring, $I^2$, provided with air-ports $i^2$, that register with corresponding ports, $i$, in casing I', the volume of air admitted to casing I' being regulated by adjusting the ring $I^2$ to more or less uncover the ports $i$ in casing I, as will be readily understood. To the cap K is coupled a pipe, M, that connects the injector with a hydrocarbon-reservoir, Q, and the said cap K has a screw-threaded axial opening in which works the adjustable injector-spindle J, inclosed in a tube, $j$. Both the spindle and tube terminate in conical portions, as usual, and the diameter of the tube $j$ is such as to form an annular passage, $j'$, between said tube $j$ and the spindle J, which passage communicates with the supply-pipe M, as more clearly shown in Fig. 6. By means of the injector the hydrocarbon supplied from reservoir Q, Figs. 1, 2, and 3, is delivered to the casing T in a fine spray, and when brought in contact with the heated surfaces of the casing and cone F, will at once be volatilized.

To absolutely insure the volatilization or vaporization of the liquid fed to the vaporizer, to prevent its collecting at the bottom of the vaporizing-chamber and being drawn into the valve-casing or the combustion-chamber of the cylinder, or prevent such liquid from luting the port that communicates with the vapor-supply pipe P, we fill the casing T with copper shavings, as shown, to a point nearly on a level with the apex of the conical portion F' of cone F. These copper shavings will be prevented from passing into the narrow annular passage formed between the throats $t^3$ $f^3$ of cones T F, and this is more effectually prevented by contracting the said throats, as above described, to make said passage undulating, thus forming a vapor-chamber below the filling and a spraying-chamber above said filling, while the cones and filling intermediate of said chambers constitute the still in which the vaporization of the hydrocarbon is effected.

The operation of the vaporizer with the engine is an automatic one, and the volume of volatile liquid fed to the vaporizer is determined by the movements of the piston, or, in other words, by the speed of the engine, so that the charge of vapor admitted to the cylinder is automatically regulated, and the operation may be briefly described to be as follows: When the piston $D^3$ makes its effective stroke under the power exerted by the expansion of the charge after the explosion thereof, the cam H opens the exhaust-valve, the hot spent gases pass through $P^5$ $t^5$ $t^6$ into the cone F, heat the same, and then pass out by pipe $P^4$. During the continuation of the effective stroke of the piston a partial vacuum is produced in pipe P and casing T, inducing a rush of air into said casing through ports $i^2$ $i$ of the injector, thereby producing, or, in fact, increasing the partial vacuum produced in tube $j$, inducing a flow of liquid hydrocarbon from the reservoir Q into tube $j$, which liquid, on issuing from the said tube in a thin annular sheet, is atomized or converted into spray by the incoming air, and said spray, falling on the heated copper shavings and the cone F, is vaporized and the vapors are drawn through said shavings into the vapor-chamber below the same, and thence through pipe P into valve-casing C and the cylinder, as above described, an additional volume of air being admitted by pipe P' and valve V' to form the explosive working compound. As soon as the piston commences its return-stroke, the valves V and V' close the vapor and air-ports and the charge is compressed, and when said piston reaches the proper point in its inward movement the charge is ignited, as above described, and the operation is repeated. If the engine were devoid of suitable regulating devices for controlling the admission-valve V, the charge of vapor admitted to the cylinder would progressively increase with the corresponding increase in the speed of the piston.

As hereinbefore described, the valve V is controlled by the movements of the piston through the governor G, and the vacuum produced in the vaporizer will vary in degree according to the extent to which the admission-port is uncovered, as will be readily understood; hence the volume of volatile liquid drawn into the vaporizer will vary with the degree of rarefaction of the air in the injector-casing, because the degree of rarefaction in said casing controls the velocity of the air entering through ports $i^2$ $i$, and consequently the degree of suction produced in tube $j$. In this manner the volume of volatile liquid drawn into the injector is regulated. There is still another advantage in this mode of vaporizing the working fuel, in that the proportion of air mixed therewith in the injector is always in proportion to the volume of vapors evolved, so that the said vapors will always have the same density before a further supply of air is admitted thereto, which supply may be regulated, as above described.

To start the engine, the vaporizer may be heated either by a burner supplied with liquid hydrocarbon or with ordinary illuminating-gas, or by supplying the engine with light hydrocarbons that do not require heat to volatilize the same.

Instead of copper shavings, any other suitable heat-conducting material in a reduced or attenuated condition may be placed as a filling in the vaporizer, and, if desired, the said vaporizer may be inclosed in a non-conducting envelope—such as asbestus, or other like or suitable non-conductor of heat. The vaporizer may also be employed as a means for heating or superheating gases for operating the engine—as, for instance, ordinary illuminating-gas may be fed to the injector and heated or superheated during its passage through the apparatus—and in this case the injector may be dispensed with, the ports $i\ i^2$ being closed by simply rotating the ring $I^2$, so that the ports therein will not register with those in casing $I'$.

We have herein described a gravity-valve for admitting the charges to the power or working cylinder. It is obvious, however, that a slide-valve connected with the lever L in a proper manner may be employed instead, though we prefer the gravity-valve as being more simple in construction and operation.

Having now described our said invention and in what manner the same is to be performed, what we claim, and desire to secure by Letters Patent, is—

1. The combination, with a gas or vapor engine, of a vaporizer provided with a vaporizing chamber and a heater, respectively connected with the admission and exhaust of the engine, and an injector connected with the volatile-liquid supply and the vaporizing-chamber, and operated from and controlled by the movements of the piston, substantially as and for the purpose specified.

2. The combination, with a gas or vapor engine, of a vaporizer composed of an outer conical casing and an inner hollow conical heater, the two forming between them a vaporizing-chamber, connections between said chamber and heater with the admission and exhaust of the engine, respectively, and a connection between the vaporizing-chamber and the source of supply of volatile liquid, substantially as and for the purpose specified.

3. The combination, with a gas or vapor engine, of a vaporizer composed of two hollow cones of different dimensions arranged concentrically one within the other and forming between them a vaporizing-chamber, the throats of said cones having a contracted or narrower portion to impart to the chamber a vertical undulation, passages for connecting said chamber below and above its undulatory portion, respectively, with the admission-valve casing and the source of supply of volatile liquid, and a passage for connecting the inner cone with the exhaust-valve casing, substantially as and for the purpose specified.

4. The combination, with a gas or vapor engine, of a vaporizer composed of two hollow conical casings arranged concentrically one within the other, the conical portion of the inner casing being formed on much greater angles than the corresponding portion of the outer casing, the throats of said cones differing but slightly in diameter and having an annular inwardly bent or contracted portion, whereby a chamber of comparatively small area and having a vertical undulation at the base is formed between the two cones, connections between the chamber, the source of supply of volatile liquid, and the admission valve casing of the engine, and means for heating the inner cone, substantially as and for the purpose specified.

5. The combination, with a gas or vapor engine, of a vaporizer composed of two hollow conical casings arranged concentrically one within the other, the conical portion of the inner casing being formed on much greater angles than the corresponding portion of the outer casing, the throats of said cones differing but slightly in diameter and having an annular inwardly bent or contracted portion, whereby a chamber of comparatively small area and having a vertical undulation at the base is formed between the two cones, an injector for injecting a volatile liquid into said chamber above the inner cone, a connection between the chamber below its undulatory portion with the admission-valve casing of the engine, and means for heating the inner cone, substantially as and for the purpose specified.

6. A vaporizer for vaporizing volatile liquids, composed of a heating-chamber and a vaporizing-chamber surrounding the same, of an injector arranged axially within the vaporizing-chamber above the heating-chamber, consisting of a hollow conical casing provided with adjustable air-admission ports, an injector-tube arranged axially within said casing, the two forming between them an air-chamber, a regulating-spindle arranged axially within the injector-tube, the two forming between them a fluid-chamber, a connection between the latter chamber and the source of supply of liquid to be vaporized, and a suction-pipe for drawing the vapors from the vaporizing-chamber and producing a partial vacuum therein, substantially as and for the purpose specified.

7. A vaporizer for vaporizing volatile liquids, composed of a heater, a vaporizing-chamber surrounding the heater, the lower portion of which chamber is contracted or of comparatively small area, in combination with a heat-conducting filling arranged loosely in the vaporizing-chamber around the heater and above the contracted portion of said chamber, a vapor-chamber formed below the filling, and a spraying-chamber above said filling, an atomizer for atomizing or spraying the volatile liquid admitted into the vaporizing-chamber, and an eduction-pipe connected with the chamber below the filling for drawing off the vapors, substantially as and for the purpose specified.

In testimony whereof we affix our signatures in presence of two witnesses.

GASTON RAGOT.
GUILLAUME SMYERS.

Witnesses:
HENRI RACLOT,
LABASQUE.